(12) United States Patent
Gan

(10) Patent No.: US 9,734,020 B2
(45) Date of Patent: Aug. 15, 2017

(54) DATA CONFIGURATION METHOD AND DEVICE, AND DATA CONFIGURATION ROLLBACK METHOD AND DEVICE

(71) Applicant: HUAWEI TECHNOLOGIES CO., LTD., Shenzhen (CN)

(72) Inventor: Jiadong Gan, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 14/142,332

(22) Filed: Dec. 27, 2013

(65) Prior Publication Data

US 2014/0114914 A1  Apr. 24, 2014

Related U.S. Application Data

(63) Continuation of application No. PCT/CN2011/083874, filed on Dec. 13, 2011.

(51) Int. Cl.
| | |
|---|---|
| G06F 11/14 | (2006.01) |
| G06F 11/20 | (2006.01) |
| G06F 17/30 | (2006.01) |
| H04L 12/24 | (2006.01) |

(52) U.S. Cl.
CPC ...... *G06F 11/1469* (2013.01); *G06F 11/1474* (2013.01); *G06F 11/2094* (2013.01); *G06F 17/30289* (2013.01); *H04L 41/0863* (2013.01); *H04L 41/0866* (2013.01); *H04L 41/0816* (2013.01)

(58) Field of Classification Search
CPC ..... G06F 11/2097; G06F 8/68; G06F 11/2094
See application file for complete search history.

(56) References Cited

U.S. PATENT DOCUMENTS

| | | | |
|---|---|---|---|
| 9,104,630 B1 * | 8/2015 | Klein | G06F 11/1469 |
| 2006/0007944 A1 * | 1/2006 | Movassaghi | H04L 41/0813 370/401 |
| 2008/0288646 A1 | 11/2008 | Hasha et al. | |
| 2009/0276430 A1 * | 11/2009 | Bruso | G06F 17/30362 |
| 2010/0274758 A1 | 10/2010 | Tahara et al. | |

(Continued)

FOREIGN PATENT DOCUMENTS

| | | |
|---|---|---|
| CN | 1678088 A | 10/2005 |
| CN | 101535977 A | 9/2009 |
| CN | 102215129 A | 10/2011 |

*Primary Examiner* — Mariela Reyes
*Assistant Examiner* — Courtney Harmon
(74) *Attorney, Agent, or Firm* — Brinks, Gilson & Lione

(57) ABSTRACT

A data configuration method and device, and a data configuration rollback method and device are applied to the field of information processing technologies. The data configuration method includes: receiving a data configuration operation request, where the data configuration operation request includes an data insert request, a data delete request, or an data update request; allocating an operation serial number to the data configuration operation request; and recording the allocated operation serial number and data requested to be operated by the data configuration operation request, as a mapping relationship between a creation operation serial number, a deletion operation serial number, and the data according to the data configuration operation request.

14 Claims, 5 Drawing Sheets

(56) References Cited

U.S. PATENT DOCUMENTS

2012/0109895 A1* 5/2012 Zwilling ............. G06F 11/1471
707/648
2013/0339312 A1* 12/2013 Schreter ............ G06F 17/30348
707/687

* cited by examiner

DATA CONFIGURATION METHOD AND DEVICE, AND DATA CONFIGURATION ROLLBACK METHOD AND DEVICE

CROSS-REFERENCE TO RELATED APPLICATIONS

This application is a continuation of International Application No. PCT/CN2011/083874, filed on Dec. 13, 2011, which is hereby incorporated by reference in its entireties.

TECHNICAL FIELD

The present invention relates to the field of information processing technologies, and in particular, to a data configuration method and device, and a data configuration rollback method and device.

BACKGROUND

In the field of information processing technologies, certain data configurations are needed during management of devices or services, for example, a configuration of information such as information of a physical infrastructure, a logical structure, and a service. Specifically, configuration data may be used to describe a real configuration item in the form of a record. For example, in a relational database, a table is created for a device board to manage configuration data of the board.

Data configuration rollback is an important function, and mainly means that: after a data configuration operation is performed, newly configured data is verified; if the newly configured data is found to be incorrect, the data configuration needs to be rolled back to previously configured data; and if the newly configured data is correct, implementation of the newly configured data is confirmed.

An existing data configuration includes: when a configuration operation is started, backing up current configuration data to form data in an active state and data in a standby state; after the data in the active state is configured for several times, if a data configuration needs to be rolled back, switching states of the data configured and the data not configured, so that the data in the active state is the data not configured; and if the newly configured data is correct, deleting the data not configured. However, this method requires that the current configuration data should be backed up. Therefore, requirements for storage space are increased, and single-step rollback can be hardly supported.

In another data configuration method, there is no need to back up configuration data, and therefore, requirements for storage space are lowered, and single-step rollback can be supported. Specifically, during each data configuration operation, a reverse operation is formed for the data configuration operation. If a data configuration needs to be rolled back, the rollback function can be implemented by performing the reverse operation. Because some data configuration operations in a specific data configuration process are complex, an algorithm for generating reverse operations is complex; furthermore, because there are many data configuration operations, all of which require that the corresponding reverse operations should be performed during rollback, the rollback takes a long time, that is, the rollback rate is low.

SUMMARY

Embodiments of the present invention provide a data configuration method and device, and a data configuration rollback method and device, which simplify data configurations and rollback operations thereof.

An embodiment of the present invention provides a data configuration method, including:
receiving a data configuration operation request, where the data configuration operation request includes an data insert request, a data delete request, or an data update request;
allocating an operation serial number to the data configuration operation request; and
recording the allocated operation serial number and data requested to be operated by the data configuration operation request, as a mapping relationship between a creation operation serial number, a deletion operation serial number, and the data according to the data configuration operation request.

An embodiment of the present invention further provides a data configuration device, including:
a request receiving unit, configured to receive a data configuration operation request, where the data configuration operation request includes an data insert request, a data delete request, or an data update request;
a serial number allocating unit, configured to allocate an operation serial number to the operation request received by the request receiving unit; and
a recording unit, configured to record the operation serial number allocated by the serial number allocating unit and data requested to be operated by the data configuration operation request, as a mapping relationship between a creation operation serial number, a deletion operation serial number, and the data according to the data configuration operation request received by the request receiving unit.

In the data configuration process in this embodiment, an operation serial number needs to be allocated to each data configuration operation request, where the data configuration operation request includes an data insert request, a data delete request, or an data update request; and the allocated operation serial number and data requested to be operated by the data configuration operation request are recorded as a mapping relationship between a creation operation serial number, a deletion operation serial number, and the data according to the data configuration operation request. In this way, as compared with the prior art in which a reverse operation needs to be generated during each data configuration operation, operations of allocating and recording the operation serial number and recording the data in this embodiment are relatively simple, and therefore, the data configuration operation is simplified; furthermore, in this embodiment, only the mutual association relationship between the data, the creation operation serial number, and the deletion operation serial number needs to be stored, and requirements for storage space are not high.

An embodiment of the present invention provides a data configuration rollback method, including:
obtaining a rollback operation serial number of a data configuration; and
obtaining, according to a recorded mapping relationship between a creation operation serial number, a deletion operation serial number, and data, data corresponding to a creation operation serial number that is smaller than or equal to the rollback operation serial number and a deletion operation serial number that is greater than the rollback operation serial number or a deletion operation serial number that is null;
or, obtaining, according to a recorded mapping relationship between a creation operation serial number, a deletion operation serial number, and data, data corresponding to a creation operation serial number that is greater than or equal to the rollback operation serial number and a deletion operation serial number that is smaller than the rollback operation serial number or a deletion operation serial number that is null.

An embodiment of the present invention provides a data configuration device, including:

a rollback serial number obtaining unit, configured to obtain a rollback operation serial number of a data configuration;

a configuration data obtaining unit, configured to obtain, according to a mapping relationship recorded in a storing unit, data corresponding to a creation operation serial number that is smaller than or equal to the rollback operation serial number obtained by the rollback serial number obtaining unit and a deletion operation serial number that is greater than the rollback operation serial number obtained by the rollback serial number obtaining unit; or configured to obtain data corresponding to a creation operation serial number that is greater than or equal to the rollback operation serial number and a deletion operation serial number that is smaller than the rollback operation serial number or a deletion operation serial number that is null; and the storing unit, configured to store a mapping relationship between the creation operation serial number, the deletion operation serial number, and the data.

As can be seen, in the data configuration rollback method and the related device in the embodiments of the present invention, after a rollback operation serial number of a data configuration is obtained, data corresponding to a creation operation serial number that is smaller than or equal to (or greater than or equal to) the rollback operation serial number and a deletion operation serial number that is greater than (or smaller than) the rollback operation serial number or a deletion operation serial number that is null, is obtained. As compared with the prior art in which rollback is implemented by performing a reverse operation, in the rollback process in the embodiments of the present invention, data configuration rollback can be implemented by only searching for data according to an association relationship, and the data configuration can be rolled back to any one of performed data configurations, thereby simplifying the data configuration rollback operation and improving the rollback rate.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a perOSN of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a perOSN of ordinary skill in the art based on the embodiments of the present invention without creative efforts shall fall within the protection scope of the present invention.

Figure 1:
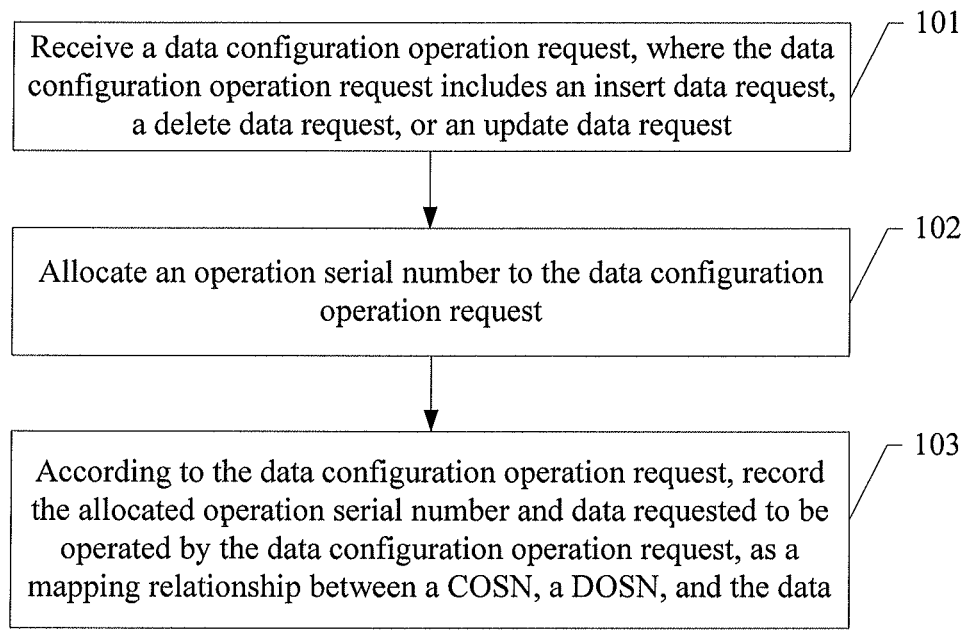
FIG. 1 is a flowchart of a data configuration method according to an embodiment of the present invention.

Embodiments of the present invention provide a data configuration method and a corresponding data configuration rollback method, which are applied to any field having a data configuration function. The data configuration method is executed by a device having a data configuration function (that is, a data configuration device). A flowchart is shown in FIG. 1, including:

Step 101: Receive a data configuration operation request, where the data configuration operation request includes an insert (Insert) data request, a delete (delete) data request, or an data update request.

It may be understood that, during management of a device or a service and so on, a configuration of related data of the device or the service and so on needs to be triggered through a data configuration operation request. Specifically, a user may send a data configuration operation request through a service layer, and trigger the data configuration process in this embodiment; or other operations in a system may also trigger the data configuration process.

The data configuration operation request may include information such as a data address requested to be configured, an identifier, and a specific operation (such as inserting data, or modifying data, or updating data).

Step 102: Allocate an operation serial number to the data configuration operation request.

After receiving the data configuration operation request, the data configuration device may allocate an operation serial number (Operation Serial Number, OSN) to the operation request in an incremental or decremental manner, so as to uniquely identify a data configuration operation request. If allocation is performed in an incremental (or decremental) manner, the operation serial number allocated to the currently received operation request is a result of adding (or subtracting) 1 or n on the basis of an operation serial number allocated to a previously obtained operation request.

Step 103: Record the operation serial number allocated in step 102 and data requested to be operated by the data configuration operation request, as a mapping relationship between a creation operation serial number (Creation OSN, COSN) of inserting configuration data, a deletion operation serial number (Deletion OSN, DOSN) of deleting configuration data, and the data according to the data configuration operation request.

Each type of data recorded in this embodiment is mutually associated with a COSN and a DOSN. For example, there are two types of data, that is, data of a device model and data of a device delivery date, where the data of the device model (or the data of the device delivery date) is mutually associated with a COSN and a DOSN.

Specifically, the step of recording a mapping relationship specifically includes:

if the data configuration operation request is the data insert request, an operation requested by the operation request being an operation of inserting data, recording inserted data requested by the data insert request, and recording a COSN corresponding to the inserted data as the OSN allocated in step 102 and a deletion operation serial number corresponding to the inserted data as null;

if the data configuration operation request is the data delete request, an operation requested by the operation request being an operation of deleting data, recording a DOSN corresponding to deleted data requested by the data delete request as the OSN allocated in step 102; and if the data configuration operation request is the data update request, an operation requested by the operation request being a configuration operation of deleting original data and inserting new data, recording updated data requested by the data update request, recording a COSN corresponding to the updated data as the OSN allocated in step 102, and recording a DOSN corresponding to original data requested by the data update request as the COSN allocated in step 102.

It should be noted that, the above steps 101 to 103 are an operation process of performing a data configuration, that is, a process of operating a data configuration operation request. After several data configurations are performed according to the above steps 101 to 103, each piece of data (one piece of data includes at least one type of data) stored in the system records a corresponding creation operation serial number COSN, but not every piece of data records a corresponding deletion operation serial number DOSN. Deletion operation serial numbers corresponding to some items of data are null, which indicates that the items of data are not deleted in the data configuration process.

As can be seen, in the data configuration process in this embodiment, an operation serial number needs to be allocated to each data configuration operation request, where the data configuration operation request includes an data insert request, a data delete request, or an data update request; and the allocated operation serial number and data requested to be operated by the data configuration operation request are recorded as a mapping relationship between a creation operation serial number, a deletion operation serial number, and the data according to the data configuration operation request. In this way, as compared with the prior art in which a reverse operation needs to be generated during each data configuration operation, operations of allocating and recording the operation serial number and recording the configuration data in this embodiment are relatively simple, and therefore, the data configuration operation is simplified; furthermore, in this embodiment, only the mutual association relationship between data, the creation operation serial number, and the deletion operation serial number needs to be stored, and requirements for storage space are not high.

It should be noted that, an active operation serial number (Active OSN, AOSN) may be further preset in the data configuration device to indicate active data in the recorded data in the system after the data configuration of the above steps 101 to 103. In this way, the data configuration device can display the active data according to the AOSN.

Specifically, if the operation serial number is allocated in an incremental manner when the above step 102 is performed, data corresponding to a creation operation serial number that is smaller than or equal to an active operation serial number and a deletion operation serial number that is greater than the active operation serial number or a deletion operation serial number that is null, is displayed; if the operation serial number is allocated in a decremental manner when the above step 102 is performed, data corresponding to a creation operation serial number that is greater than or equal to an AOSN and a deletion operation serial number that is smaller than the AOSN or a deletion operation serial number that is null, is displayed. Particularly, in this embodiment, data requested to be deleted by the operation request is stored at a bottom layer of the configuration device but is not displayed at the service layer. In this way, from the perspective of the user, the data is deleted, and the deleted data is transparent to the user.

(1) In a scenario:

In the data configuration process, after performing each data configuration operation, the data configuration device may activate currently configured data. Therefore, the AOSN configured in the data configuration device needs to be updated according to a change of the allocated operation serial number, and is specifically updated to an operation serial number allocated to a current data configuration operation request.

(2) In another scenario:

In the data configuration process, after performing several data configuration operations, the data configuration device does not need to activate data configured each time, but may activate the several configurations only if the configurations are correct. If the configurations are incorrect, the data configuration device does not activate the several configurations, thereby simplifying the data configuration process. In this case, a current operation serial number (Present OSN, POSN) needs to be preset in the data configuration device, and an AOSN may be a preset operation serial number. After a configuration data operation is started, the AOSN is not changed, but the POSN needs to be updated with a change of the allocated operation serial number, and specifically, updated to an operation serial number allocated to a current data configuration operation request.

Furthermore, in the data configuration process, the data configuration device may not need to display the active data according to the AOSN, but instead, may display, according to the POSN, data that is recorded according to steps 101 to 103 but is not activated. In this way, the user can continue configurations according to the displayed data only. Specifically, when the configuration data is displayed according to the POSN, if the operation serial number is allocated in an incremental manner when the above step 102 is performed, data corresponding to a creation operation serial number that is smaller than or equal to the POSN and a deletion operation serial number that is greater than the POSN or a deletion operation serial number that is null, is displayed; if the operation serial number is allocated in a decremental manner when the above step 102 is performed, data corresponding to a creation operation serial number that is greater than or equal to the POSN and a deletion operation serial number that is smaller than the POSN or a deletion operation serial number that is null, is displayed.

After several data configurations, if the configurations are correct, when the several data configurations are activated, the preset AOSN value may be set to the POSN value; if the configurations are incorrect, the several data configurations are not activated.

In other specific embodiments, to ensure correctness of data configuration operations, after the data configuration device performs the above step 101, that is, after receiving the operation request, the data configuration device needs to further determine whether a data configuration operation requested by the operation request received in step 101 is valid, and if yes, executes step 102, or if not, ends the procedure.

Specifically, when determining validity, the data configuration device may determine, according to a preset policy, whether a service logic corresponding to the operation request is correct. For example, if the operation request is for configuring data of attributes of a board, such as a rack number and a subrack number, the rack number and subrack number and so on need to be stored in the device.

Figure 2:
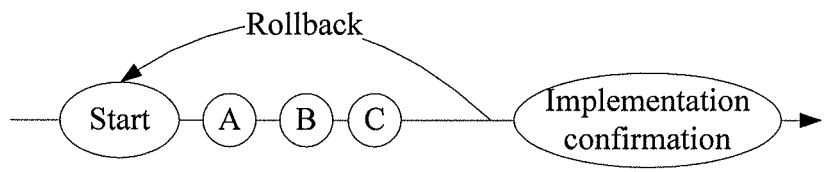
FIG. 2 is a flowchart of a data configuration process according to an embodiment of the present invention.

As shown in FIG. 2, after the data configuration device performs several (for example, A, B, and C operations) data configurations according to steps 101 to 103, the data configuration device needs to verify the newly configured data, and if the configurations are correct, confirms to implement the newly configured data. Specifically, the data configuration device may delete data corresponding to a DOSN that is smaller than or equal to an active operation serial number (AOSN), where the specific value of the AOSN may be configured by the user through the service layer or may also be an operation serial number allocated to the current data configuration operation request. If the configurations are incorrect, the data configuration device needs to perform data configuration rollback, where the data configuration may be rolled back to any one of data configuration operations, such as operation A or B.

Figure 3:
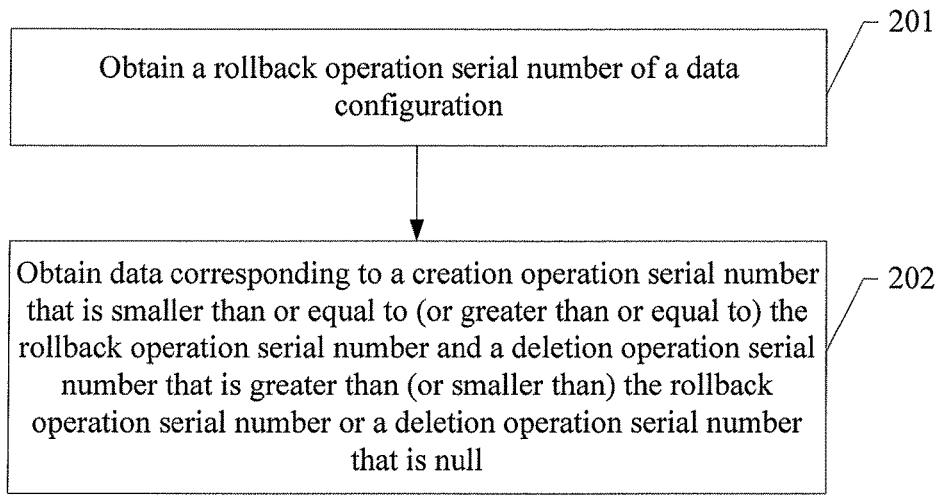
FIG. 3 is a flowchart of another data configuration method according to an embodiment of the present invention.

In an embodiment of the present invention, a data configuration rollback method may be executed by a device having a data configuration function (that is, a data configuration device). A flowchart is shown in FIG. 3, including:

Step 201: Obtain a rollback operation serial number of a data configuration.

Herein, the rollback operation serial number may be regarded as an operation serial number allocated when a data configuration operation request is executed in the data configuration process. Furthermore, the rollback method in this embodiment may be triggered by sending a rollback request by a user through a service layer, where the rollback request may include the rollback operation serial number.

Step 202: Obtain, according to a recorded mapping relationship between a creation operation serial number, a deletion operation serial number, and data, data corresponding to a creation operation serial number of inserting configuration data which is smaller than or equal to the rollback operation serial number and a deletion operation serial number of deleting configuration data which is greater than the rollback operation serial number or a deletion operation serial number that is null.

Alternatively, data corresponding to a creation operation serial number of inserting configuration data which is greater than or equal to the rollback operation serial number and a deletion operation serial number of deleting configuration data which is smaller than the rollback operation serial number or a deletion operation serial number that is null, is obtained. If the deletion operation serial number is null, it indicates that data corresponding to the deletion operation serial number is not deleted in the data configuration process.

If the operation serial number allocated to the data configuration operation request is incremental, for a same piece of data, corresponding creation operation serial number is definitely smaller than the deletion operation serial number, and data corresponding to a creation operation serial number that is smaller than or equal to the rollback operation serial number and a deletion operation serial number that is greater than the rollback operation serial number or a deletion operation serial number that is null, is obtained. Therefore, data configuration rollback is implemented, that is, the data configuration is rolled back to a data state after an operation request corresponding to the rollback operation serial number is executed, and specifically, a state before a deletion operation is not performed for the obtained data.

For example, for two types of data a and b, when a data configuration operation request corresponding to an operation serial number being 102 is obtained, configuration data a=2 and b=3 is inserted. When it is obtained that a data configuration operation request corresponding to an operation serial number being 103 is a request for deleting configuration data a=2 and b=3, a system stores a mapping relationship between configuration data a=2 and b=3, COSN=102, and DOSN=103. In this case, what is displayed to the user does not include the piece of data a=2 and b=3. During data configuration rollback, if a currently received rollback operation serial number is 102, data corresponding to a DOSN that is greater than 102 and a COSN that is smaller than or equal to 102 is obtained, that is, a=2 and b=3.

If the operation serial number allocated to the data configuration operation request is decremental, for a same piece of data, a corresponding creation operation serial number is definitely greater than the deletion operation serial number, and data corresponding to a creation operation serial number that is greater than or equal to the rollback operation serial number and a deletion operation serial number that is smaller than the rollback operation serial number or a deletion operation serial number that is null, is obtained. Therefore, data configuration rollback is implemented, that is, the data configuration is rolled back to a data state after the data configuration operation request corresponding to the rollback operation serial number is executed, and specifically, a state before a deletion operation is not performed for the obtained data.

As can be seen, data configuration rollback is implemented through the above steps 201 to 202. Specifically, after a rollback operation serial number of a data configuration is obtained, data corresponding to a creation operation serial number that is smaller than or equal to (or greater than or equal to) the rollback operation serial number and a deletion operation serial number that is greater than (or smaller than) the rollback operation serial number or a deletion operation serial number that is null, is obtained. As can be seen, as compared with the prior art in which rollback is implemented by performing a reverse operation, in the rollback process in the embodiment of the present invention, data configuration rollback can be implemented by only searching for data according to a mapping relationship, and the data configuration can be rolled back to any one of performed data configurations, thereby simplifying the data configuration rollback operation and improving the rollback rate.

It should be noted that, the creation operation serial number, deletion operation serial number, and data in the above embodiment are mutually mapped, and that the mutual mapping relationship between the three may be stored through any form of media, for example, stored through a magnetic disk or memory or flash memory; and may also be stored in any form of logical structure, for example, stored in a form such as a relationship table or database or tree or linked list. The mutual association relationship may be indicated by using the following methods:

(1) indicated by the mapping relationship between the creation operation serial number, the deletion operation serial number, and the data, which is stored by using a configuration item table;

(2) indicated by mapping relationships stored in two configuration item tables, specifically, indicated by the mapping relationship between the creation operation serial number and the data, which is stored by using a first configuration item table, and the mapping relationship between the deletion operation serial number and the data, which is stored by using a second configuration item table; in this case, the two configuration item tables are associated by using a same type of data in the first configuration item table and the second configuration item table; and (3) indicated by mapping relationships stored in two configuration item tables, specifically, mainly in a case where multiple types of data are stored, indicated by multiple types of data stored by using a third configuration item table, and a mapping relationship between the creation operation serial number, the deletion operation serial number, and data of at least one type in the multiple types of data in the third configuration item table, which is stored by using a fourth configuration item table. In this case, at least one type of data stored in the fourth configuration item table is used as an associated item to associate the third configuration item table and the fourth configuration item table.

The following describes the data configuration method and data configuration rollback method in this embodiment by using specific examples:

Specific Application Example 1

Figure 4:
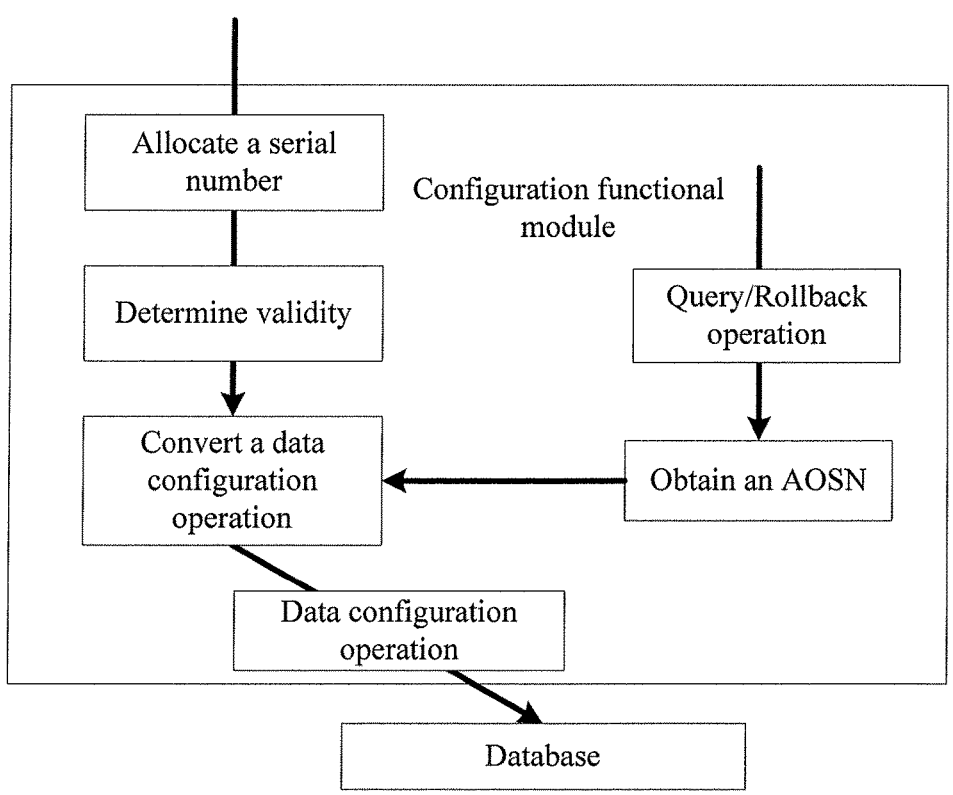
FIG. 4 is a schematic structural diagram of a data configuration and rollback process according to an embodiment of the present invention.

In this embodiment, two types of data, that is, a and b, are stored in the database, and the mutual association relationship between the creation operation serial number, the deletion operation serial number, and the data is indicated by using method (1). Therefore, the configuration item table in this embodiment is tbl (a, b, cosn, dosn). A specific schematic structural diagram of a data configuration and rollback process is shown in FIG. 4, including:

Step 301: A user delivers a data configuration operation request to a configuration functional module of a data configuration device through a service layer, and therefore a serial number allocating submodule in the configuration functional module allocates an OSN to the operation request. The allocated OSN in this embodiment is unidirectionally incremental, and the allocated OSN in other embodiments may be unidirectionally decremental.

Step 302: A validity determining submodule in the configuration functional module determines whether the operation request is valid, and mainly performs a service logic analysis for the operation request, analyzes validity of data requested to be operated by the operation request, and determines consistency with the stored data in a system, and so on. If it is determined that the operation request is valid, a data configuration operation converting submodule in the configuration functional module performs step 303, and if the operation request is invalid, the procedure is ended.

For example, if the operation request requests to configure attributes of a board whose rack number is x and whose subrack number is y, the operation request is valid only when rack number x and subrack number y of the board are stored in a database of the data configuration device. For another example, if the database further stores a rack attribute of the board, the operation request is valid only when the rack number of the board that is stored in the database is consistent with a rack number requested by the operation request.

Step 303: The data configuration operation converting submodule in the configuration functional module may convert the operation request according to a preset conversion rule, and convert the operation request into an actual operation for a database in the data configuration device.

For example, if the operation request is an data insert request, the data configuration operation converting submodule may perform conversion according to conversion rule 1, where the conversion rule 1 is: inserting data into a configuration item table of the database, setting a COSN corresponding to the inserted data in the configuration item table to an OSN corresponding to the operation request, and setting a DOSN to null;

if the operation request is a data delete request, the data configuration operation converting submodule may perform conversion according to conversion rule 2, where the conversion rule 2 is: setting a DOSN corresponding to data to be deleted in the configuration item table to an OSN of the operation request; in this case, the data in the configuration item table does not need to be deleted from the configuration item table, but instead, the data to be deleted is not displayed to the user; and if the operation request is an data update request, the data configuration operation converting submodule may perform conversion according to conversion rule 3, where the conversion rule 3 is: setting a DOSN corresponding to original data to be deleted in the configuration item table to an OSN of the operation request, inserting new data into the configuration item table, and setting a COSN corresponding to the inserted data to the OSN of the operation request and setting the DOSN to null; in this case, the original data does not need to be deleted from the configuration item table, but instead, the original data to be deleted is not displayed to the user.

The following Table 1 shows operations after three operation requests are converted.

TABLE 1

| OSN of an Operation Request | Before Conversion | After Conversion |
|---|---|---|
| 100 | Insert configuration data of a = 1 and b = 1 | Insert a = 1 and b = 1 into the configuration item table, set the corresponding cosn to 100 and the dosn to null |
| 101 | Delete configuration data of a = 1 | Update the dosn corresponding to a = 1 to 101 |
| 102 | Set b to 2 when a = 1 | Insert a = 1 and b = 2 into the configuration item table, and set the corresponding cosn to 102 and the dosn to null; then update the dosn originally corresponding to the a = 1 to 102 |

Step 304: A data configuration operation submodule in the configuration functional module performs a corresponding operation for the database according to the actual operation of conversion.

It may be understood that, an AOSN is preset in the data configuration device. In the process of performing a data configuration of the above steps 301 to 304, the data configuration device may activate data configured each time. Therefore, the AOSN is updated with the change of an operation serial number allocated to the operation request, and is updated to an operation serial number allocated to a current operation request, and the data configuration device displays the activated configuration data according to the AOSN.

After the data configuration is completed, if it is determined, in the process of verifying the newly configured data, that data configuration rollback is required, rollback may be performed according to the following step 306, and the previously configured data may be queried according to the following step 305. If it is determined that data configuration rollback is not required, implementation of the newly configured data may be confirmed. Specifically, data corresponding to a DOSN that is smaller than or equal to the AOSN may be deleted from the configuration item table, and the COSN and DOSN may also be deleted. Furthermore, the specific value of the AOSN is an operation serial number allocated to a present data configuration operation request, and may also be configured by the user through the service layer.

Step 305: For a data query, the user may trigger a query process by delivering a query operation request through the service layer. The query operation request may include specific information to be queried, and the query operation request may further include a configured AOSN, and so on. After a query/rollback operation submodule in the configuration functional module receives the query operation request, an AOSN obtaining submodule obtains the preset AOSN in the data configuration device or the configured AOSN in the query operation request. The data configuration operation converting submodule converts the query operation request into an actual operation for the database according to the obtained AOSN, and the data configuration operation submodule performs a corresponding operation for the database.

For example, the query operation request received by the query/rollback operation submodule includes query information that is querying configuration data of a=1 in the configuration item table. Then, the AOSN obtaining submodule finds that the current AOSN is 101. Furthermore, the actual operation for conversion of the data configuration operation converting submodule is: in the configuration item table, querying configuration data when a=1 and the corresponding dosn is not null and cosn <=101<dosn.

It may be understood that, the user may configure multiple AOSNs, and therefore the delivered query operation request includes multiple AOSNs. In this way, the data configuration operation converting submodule may convert the query operation request into multiple actual operations for the database according to multiple AOSNs respectively, and the data configuration operation submodule performs corresponding operations on the database to obtain multiple items of data. In this way, differences between data after two data configuration operations may be analyzed.

Step 306: For data configuration rollback, the user may trigger a rollback process by delivering, through the service layer, a rollback operation request, and the rollback operation request needs to include a rollback operation serial number. After the query/rollback operation submodule in the configuration functional module receives the rollback operation request, the AOSN obtaining submodule uses the rollback operation serial number as the AOSN value, and the data configuration operation converting submodule converts the rollback operation request into an actual operation for the database according to the AOSN obtained by the AOSN obtaining submodule, and the data configuration operation submodule performs a corresponding operation for the database.

For example, if the received rollback operation request includes a rollback operation serial number being 101, the AOSN obtaining submodule uses 101 as the AOSN value, and the actual operation converted by the data configuration operation converting submodule is: searching the configuration item table for data corresponding to cosn <=101<dosn.

The following uses three data configuration processes for detailed description. The database of the data configuration device stores a configuration item table, and the table may include two types of data a and b (in the table, one column represents a type of data, but in other embodiments, one row may represent a type of data) and corresponding cosn and dosn.

Figure 5:
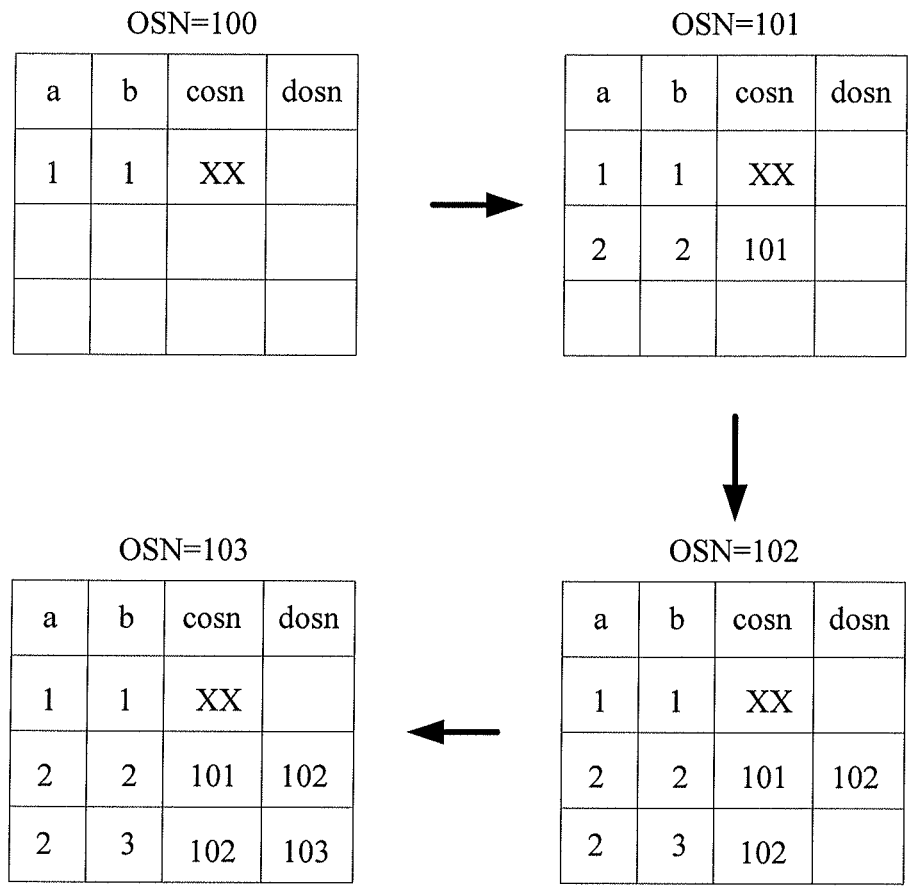
FIG. 5 is a schematic structural diagram of a configuration item table in a data configuration process according to an embodiment of the present invention.

As shown in FIG. 5, when no data configuration operation is performed, the initial value of the OSN is 100, and the database has stored data of a=1 and b=1. In this case, the cosn corresponding to a=1 and b=1 is unavailable and the dosn is null.

If the received data configuration operation request is a request for inserting a=2 and b=2, the data configuration device allocates the OSN being 101 to the operation request, inserts a=2 and b=2 into the configuration item table, and sets the corresponding cosn to 101 and the dosn still to null.

If the received data configuration operation request is a request for modifying b to 3 when a=2, the data configuration device allocates the OSN being 102 to the operation request, inserts a=2 and b=3 into the configuration item table, and sets the dosn corresponding to an item of original data (in the table, one row represents an piece of data, but in other embodiments, one column may represent an piece of data) a=2 and b=2 to 102 and sets the cosn corresponding to a new piece of data a=2 and b=3 to 102. In this case, a=2 and b=3 stored in the database are transparent to the user.

If the received data configuration operation request is a request for deleting a=2 and b=3, the data configuration device allocates the OSN being 103 to the operation request, and sets the dosn corresponding to a=2 and b=3 to be deleted to 103. In this case, a=2 and b=3 stored in the database are transparent to the user.

When data configuration rollback is required, the user may trigger a rollback procedure by setting, through the service layer, the rollback operation serial number to any integer between 100 and 103. Therefore, the data configuration device searches the database for data including values of a and b, and corresponding to a cosn that is smaller than or equal to the rollback operation serial number and a dosn that is greater than the rollback operation serial number or a dosn that is null in the configuration item table, thereby rolling back the configuration to a state of any item of configuration data between 100 and 103 to implement single-step rollback or all rollback.

Specific Application Example 2

In this embodiment, two types of data, that is, a and b, are stored in the database, and the mutual association relationship between the creation operation serial number, the deletion operation serial number, and the data is indicated by using method (2). Therefore, the configuration item tables in this embodiment are tbl1 (a, b, cosn) and tbl2 (a, b, dosn).

The specific data configuration and rollback process is similar to that in the embodiment corresponding to FIG. 4. The differences are that: when the cosn and dosn corresponding to data a and b are recorded, they are recorded in two configuration item tables; during data searching (or data configuration rollback), first, the two configuration item tables need to be associated and then searching is performed. Specifically when the two configuration item tables are associated, if data a and b in configuration item table 1 are consistent with data a and b in configuration item table 2, the cosn corresponding to the consistent data a and b, in the configuration item table 1, and the dosn corresponding to the consistent data a and b, in the configuration item table 2, are used as the cosn and dosn corresponding to the consistent data a and b.

Specific Application Example 3

In this embodiment, two types of data, that is, a and b, are stored in the database, and the mutual association relationship between the creation operation serial number, the deletion operation serial number, and the data is indicated by using method (3). Therefore, the configuration item tables in this embodiment are tbl3 (a, b) and tbl4 (b, cosn, dosn).

The specific data configuration and rollback process is similar to that in the embodiment corresponding to FIG. 4. The differences are that: during recording, data a and b and the corresponding cosn and dosn are recorded in the two configuration item tables respectively; during data searching (or data configuration rollback), the two configuration item tables need to be associated for searching. Specifically, first, data b corresponding to the cosn that is greater than or equal to the AOSN (or the rollback operation serial number) and the dosn that is smaller than the AOSN (or the rollback operation serial number) or the dosn that is null, may be found from configuration item table 4, and the corresponding data a is found in configuration item table 3 according to the data b. The data b is used as an associated item and may uniquely associate the data a and the corresponding cosn and dosn.

It should be noted that, in the foregoing three specific application examples, the configuration functional module in the data configuration device performs a data configuration and data configuration rollback, and that the data configuration operation converting submodule may not be independent, that is, may not perform the converting step according to the conversion rule, but instead, may perform an actual operation for the database directly according to the conversion rule.

In addition, the data configuration operation converting module may be specifically implemented with the help of a database. For example, a trigger (trigger) and a view (view) are created for the stored configuration item table in the database. After determining that the data configuration operation request is valid, the validity determining submodule triggers the trigger to perform an operation for the database directly according to a rule, where the rule of performing an operation by the trigger is consistent with the conversion rule used when the data configuration operation converting module converts the data configuration operation request. When the query/rollback operation submodule receives a query/rollback operation request, the view module searches the database for corresponding data for display according to the AOSN obtained by the AOSN obtaining submodule and a certain rule. The rule of searching for the data by the view is consistent with a rule used when the data configuration operation converting submodule converts the query/rollback operation request, and is not further described herein.

Specific Application Example 4

In a specific application scenario, when a user tries some functions through the service layer to perform a data configuration operation, the data configuration device does not activate data configured each time, but needs to preset a POSN and an AOSN in the database. The data configuration device may perform data configuration for multiple times according to the method shown in FIG. 1. In this process, the POSN is updated with the change of the operation serial number allocated to the data configuration operation request, but the preset AOSN in the database is not changed. Furthermore, the data configuration device displays, according to the POSN, the corresponding data that is recorded but not activated. If the multiple data configurations are correct, the data configured multiple times may be activated, that is, the AOSN value is set to the POSN. After some functions are tried, data in the database needs to be rolled back to the state before the data configuration, and therefore the data configuration device can read the AOSN stored in the database, and display a configuration item corresponding to the DOSN that is greater than (or smaller than) the read AOSN or the DOSN that is null and the COSN that is smaller than or equal to (or greater than or equal to) the read AOSN, stored in the database.

Figure 6:
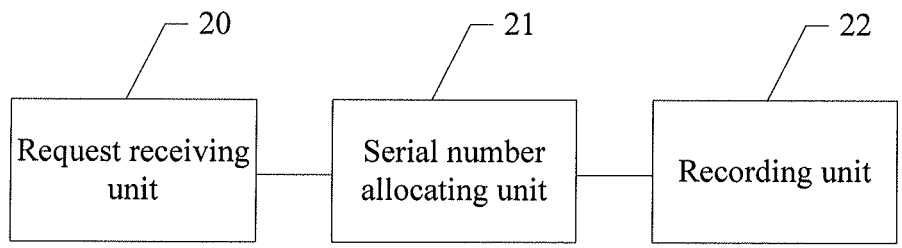
FIG. 6 is a schematic structural diagram of a data configuration device according to an embodiment of the present invention.

An embodiment of the present invention provides another data configuration device, whose schematic structural diagram is shown in FIG. 6, where the device includes:

a request receiving unit 20, configured to receive a data configuration operation request, where the data configuration operation request includes an data insert request, a data delete request, or an data update request;

a serial number allocating unit 21, configured to allocate an operation serial number to the operation request received by the request receiving unit 20; and a recording unit 22, configured to record the operation serial number allocated by the serial number allocating unit 21 and data requested to be operated by the data configuration operation request, as a mapping relationship between a creation operation serial number, a deletion operation serial number, and the data according to the data configuration operation request received by the request receiving unit 20.

Herein, the mapping relationship between the creation operation serial number, the deletion operation serial number, and the data may specifically be: the mapping relationship between the creation operation serial number, the deletion operation serial number, and the data, which is stored by using a configuration item table; or, the mapping relationship between the creation operation serial number and the data, which is stored by using a first configuration item table, and the mapping relationship between the deletion operation serial number and the data, which is stored by using a second configuration item table; or, multiple types of data stored by using a third configuration item table, and a mapping relationship between the creation operation serial number, the deletion operation serial number, and data of at least one type in the multiple types of data, which is stored by using a fourth configuration item table.

Furthermore, when the recording unit 22 specifically performs a recording operation, if the operation request received by the request receiving unit 20 is the data insert request, an operation requested by the operation request is an operation of inserting data, and the recording unit 22 records inserted data requested by the data insert request, and records a creation operation serial number corresponding to the inserted data as the operation serial number allocated by the serial number allocating unit 21 and a deletion operation serial number corresponding to the inserted data as null; if the operation request received by the request receiving unit 20 is the data delete request, an operation requested by the operation request is an operation of deleting data, and the recording unit 22 records a deletion operation serial number corresponding to deleted data requested by the data delete request as the operation serial number allocated by the serial number allocating unit 21; and if the operation request received by the request receiving unit 20 is the data update request, an operation requested by the operation request includes operations of inserting updated data and deleting original data, and the recording unit 22 records updated data requested by the data update request, records a creation operation serial number corresponding to the updated data as the operation serial number allocated by the serial number allocating unit 21, and records a deletion operation serial number corresponding to original data requested by the data update request as the operation serial number allocated by the serial number allocating unit 21.

As can be seen, in the data configuration device in this embodiment, when the request receiving unit 20 receives a data configuration operation request, where the data configuration operation request includes an data insert request, a data delete request, or an data update request, the serial number allocating unit 21 allocates an operation serial number to the data configuration operation request. The recording unit 22 records the allocated operation serial number and data requested to be operated by the data configuration operation request, as a mapping relationship between a creation operation serial number, a deletion operation serial number, and the data. In this way, as compared with the prior art in which a reverse operation needs to be generated by a data configuration device during each data configuration operation, operations of allocating and recording the operation serial number and recording data in the data configuration device in this embodiment are relatively simple, and therefore, the data configuration operation is simplified; furthermore, in this embodiment, only the mutual association relationship between the data, the creation operation serial number, and the deletion operation serial number needs to be stored, and requirements for storage space are not high.

Figure 7:
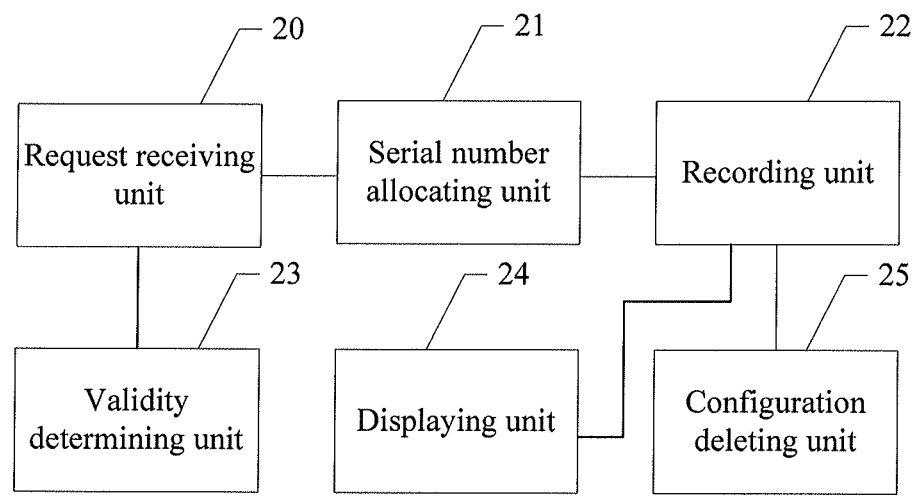
FIG. 7 is a schematic structural diagram of another data configuration device according to an embodiment of the present invention.

As shown in FIG. 7, in a specific embodiment, in addition to the structure shown in FIG. 6, the data configuration device may further include: a validity determining unit 23, a displaying unit 24, and a configuration deleting unit 25.

The validity determining unit 23 is configured to determine whether a data configuration operation requested by the operation request is valid.

The displaying unit 24 is configured to display recorded data, where the recorded data includes data corresponding to a creation operation serial number that is smaller than or equal to a preset operation serial number and a deletion operation serial number that is greater than the preset operation serial number or a deletion operation serial number that is null; or, the recorded data includes data corresponding to a creation operation serial number that is greater than or equal to a preset operation serial number and a deletion operation serial number that is smaller than the preset operation serial number or a deletion operation serial number that is null.

The preset operation serial number includes: an operation serial number allocated to a current data configuration operation request or a preset active operation serial number AOSN.

The configuration deleting unit 25 is configured to delete data corresponding to a deletion operation serial number that is smaller than or equal to an active operation serial number, where the active operation serial number is the operation serial number allocated to the current data configuration operation request.

In this embodiment, after the request receiving unit 20 obtains the operation request, first, the validity determining unit 23 may determine validity, and if the data configuration operation is valid, the serial number allocating unit 21 allocates the operation serial number, and the recording unit 22 performs recording. Furthermore, in the data configuration device in this embodiment, after the request receiving unit 20, the serial number allocating unit 21, the recording unit 22, and the validity judging unit 23 perform data configurations, the displaying unit 24 may display the data recorded by the recording unit 22. If the configurations are correct, implementation of the configured data is confirmed. Specifically, the configuration deleting unit 25 may delete a data item corresponding to a deletion operation serial number that is smaller than or equal to an active operation serial number, from the data recorded by the recording unit 22.

Figure 8:
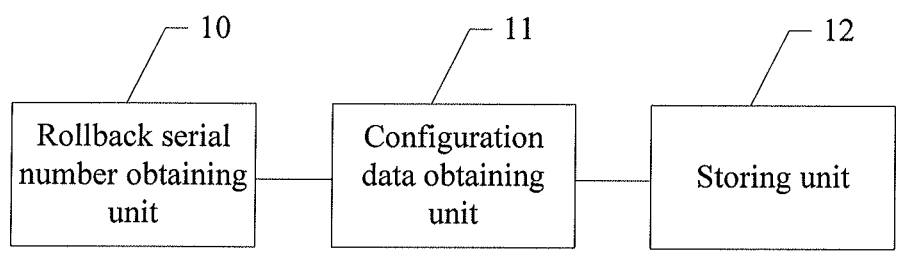
FIG. 8 is a schematic structural diagram of another data configuration device according to an embodiment of the present invention.

An embodiment of the present invention further provides a data configuration device, whose schematic structural diagram is shown in FIG. 8, where the device includes:

a rollback serial number obtaining unit 10, configured to obtain a rollback operation serial number of a data configuration;

a configuration data obtaining unit 11, configured to obtain, according to a mapping relationship recorded in a storing unit 12, data corresponding to a creation operation serial number that is smaller than or equal to the rollback operation serial number obtained by the rollback serial number obtaining unit 10 and a deletion operation serial number that is greater than the rollback operation serial number obtained by the rollback serial number obtaining unit 10 or a deletion operation serial number that is null;

or a configuration data obtaining unit 11, configured to obtain data corresponding to a creation operation serial number that is greater than or equal to the rollback operation serial number and a deletion operation serial number that is smaller than the rollback operation serial number or a deletion operation serial number that is null; and the storing unit 12, configured to store a mapping relationship between the creation operation serial number, the deletion operation serial number, and at least one type of the data.

When storing the mapping relationship, the storing unit 12 may use a configuration item table to store the mapping relationship between the creation operation serial number, the deletion operation serial number, and the data; or, the storing unit 12 uses a first configuration item table to store the mapping relationship between the creation operation serial number and the data, and uses a second configuration item table to store the mapping relationship between the deletion operation serial number and the data; or the storing unit 12 uses a third configuration item table to store multiple types of data, and uses a fourth configuration item table to store a mapping relationship between the creation operation serial number, the deletion operation serial number, and data of at least one type in the multiple types of data.

As can be seen, in this embodiment, after the rollback serial number obtaining unit 10 obtains a rollback operation serial number of a data configuration, the configuration data obtaining unit 11 obtains, according to a mapping relationship stored by the storing unit 12, data corresponding to a creation operation serial number that is smaller than or equal to (or greater than or equal to) the rollback operation serial number and a deletion operation serial number that is greater than (or smaller than) the rollback operation serial number or a deletion operation serial number that is null. As can be seen, as compared with the prior art in which rollback is implemented by performing a reverse operation, in the rollback process in the embodiment of the present invention, data configuration rollback can be implemented by only searching for data according to a mutual association relationship, and the data configuration is rolled back to a previous data configuration, thereby simplifying the data configuration rollback operation and improving the rollback rate.

Figure 9:
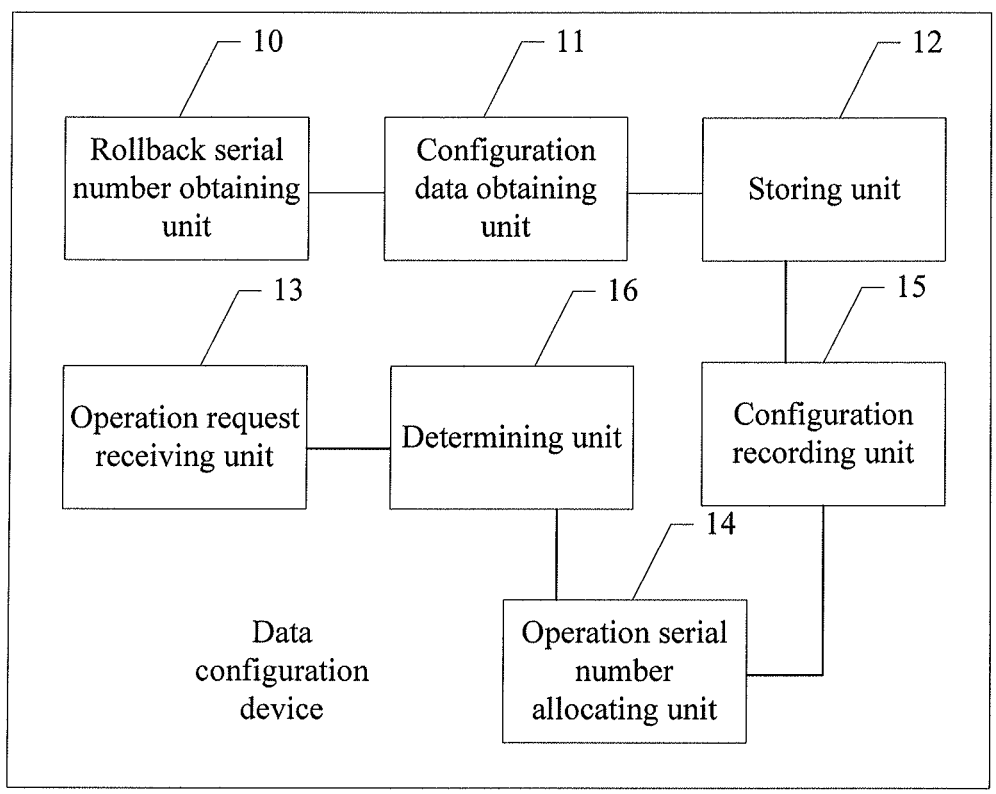
FIG. 9 is a schematic structural diagram of another data configuration device according to an embodiment of the present invention.

As shown in FIG. 9, in a specific embodiment, in addition to the structure shown in FIG. 8, the data configuration device may further include: an operation request receiving unit 13, an operation serial number allocating unit 14, a configuration recording unit 15, and a determining unit 16.

The operation request receiving unit 13 is configured to receive a data configuration operation request, where the data configuration operation request includes an data insert request, a data delete request, or an data update request.

The determining unit 16 is configured to determine whether a data configuration operation requested by the operation request is valid, and if yes, the operation serial number allocating unit 14 allocates an operation serial number.

The operation serial number allocating unit 14 is configured to allocate an operation serial number to the operation request obtained by the operation request receiving unit 13.

The configuration recording unit 15 is configured to record the allocated operation serial number and data requested to be operated by the data configuration operation request, as a mapping relationship between a creation operation serial number, a deletion operation serial number, and the data according to the data configuration operation request, and store the mapping relationship into the storing unit 12.

It may be understood that: if the data configuration operation request received by the operation request receiving unit 13 is the data insert request, the configuration recording unit 15 is configured to record inserted data requested by the data insert request, and record a creation operation serial number corresponding to the inserted data as the allocated operation serial number and a deletion operation serial number corresponding to the inserted data as null; if the data configuration operation request received by the operation request receiving unit 13 is the data delete request, the configuration recording unit 15 is configured to record a deletion operation serial number corresponding to deleted data requested by the data delete request as the allocated operation serial number; if the data configuration operation request received by the operation request receiving unit 13 is the data update request, the configuration recording unit 15 is configured to record updated data requested by the data update request, record a creation operation serial number corresponding to the updated data as the allocated operation serial number, and record a deletion operation serial number corresponding to original data requested by the data update request as the allocated operation serial number.

In this embodiment, the configuration data in the storing unit 12 may be configured through the operation request receiving unit 13, the operation serial number allocating unit 14, the configuration recording unit 15, and the determining unit 16. For the specific configuration method, refer to the description of the foregoing method embodiment, which is not described herein.

A person of ordinary skill in the art may understand that, all or a part of the steps in the methods of the foregoing embodiments may be implemented by a program instructing relevant hardware. The program may be stored in a computer readable storage medium. The storage medium may include a ROM, a RAM, a magnetic disk, or an optical disc.

The data configuration method and device, and the data configuration rollback method and device that are provided by the embodiments of the present invention are described in detail above. Although the principle and implementation manners of the present invention are described through specific examples in this specification, the descriptions of the embodiments are only intended to help understand the method and core ideas of the present invention. Meanwhile, a person of ordinary skill in the art may make modifications to the specific implementation manners and application scopes according to the ideas of the present invention. Therefore, the content of the specification shall not be construed as a limitation to the present invention.

What is claimed is:

1. A data configuration method, comprising:
   receiving a data configuration operation request, wherein the data configuration operation request comprises data to be operated;
   allocating an operation serial number to the data configuration operation request; and
   recording the allocated operation serial number in a mapping relationship according to the data configuration operation request, wherein the mapping relationship comprises the data to be operated, a creation operation serial number, and a deletion operation serial number, such that a direct rollback operation to anyone of previous data is implemented when a rollback operation serial number is requested, wherein the rollback operation serial number is anyone of the recorded operation serial numbers in the mapping relationship;
   wherein:
   when the data configuration operation request is a data insert request, and the data to be operated is inserted data, the recording the allocated operation serial number in a mapping relationship comprises: recording the creation operation serial number corresponding to the inserted data in the mapping relationship by using the allocated operation serial number, and keeping a deletion operation serial number corresponding to the inserted data empty;
   when the data configuration operation request is a data delete request, the data to be operated is deleted data, the recording the allocated operation serial number in a mapping relationship comprises: recording a deletion operation serial number corresponding to the deleted data in the mapping relationship by using the allocated operation serial number, and remaining a creation operation serial number corresponding to the deleted data unchanged;
   when the data configuration operation request is a data update request, the data to be operated comprises updated data and original data, the recording the allocated operation serial number in a mapping relationship comprises: recording a creation operation serial number corresponding to the updated data in the mapping relationship by using the allocated operation serial number, keeping a deletion operation serial number corresponding to the updated data empty, updating a deletion operation serial number corresponding to the original data in a mapping relationship by using the allocated operation serial number, and remaining a creation operation serial number corresponding to the original data unchanged.

2. The method according to claim 1, wherein after the receiving of the data configuration operation request, the method further comprises:
- determining whether a data configuration operation requested by the operation request is valid, and if yes, allocating the operation serial number to the operation request.

3. The method according to claim 1, further comprising:
- displaying the data to be operated, wherein the creation operation serial number corresponding to the displayed data to be operated is smaller than or equal to a preset operation serial number, and a deletion operation serial number corresponding to the displayed data to be operated is null or greater than the preset operation serial number;
- wherein the preset operation serial number comprises: the operation serial number allocated to a current data configuration operation request or a preset active operation serial number.

4. The method according to claim 1, further comprising:
- displaying the data to be operated, wherein a creation operation serial number corresponding to displayed data is greater than or equal to a preset operation serial number, and a deletion operation serial number corresponding to the displayed data is null or smaller than the preset operation serial number;
- wherein the preset operation serial number comprises: the operation serial number allocated to a current data configuration operation request or a preset active operation serial number.

5. The method according to any one of claim 1, further comprising:
- deleting the data to be operated, wherein the deletion operation serial number corresponding to the deleted data to be operated is smaller than or equal to an active operation serial number, wherein the active operation serial number is the operation serial number allocated to a current data configuration operation request.

6. The method according to claim 1, further comprising:
- obtaining the rollback operation serial number; and
- obtaining rollback data, wherein the creation operation serial number corresponding to the rollback data is smaller than or equal to the rollback operation serial number and a deletion operation serial number corresponding to the rollback data is null or greater than the rollback operation serial number.

7. The method according to claim 1, further comprising:
- obtaining the rollback operation serial number; and
- obtaining rollback data, wherein the creation operation serial number corresponding to the rollback data is greater than or equal to the rollback operation serial number and a deletion operation serial number corresponding to the rollback data is null or smaller than the rollback operation serial number.

8. A computer, comprising a processor, a memory, a bus, and a communication interface, wherein:
- the memory is adapted to store a computer execution instruction;
- the processor is connected to the memory through the bus; and when the computer is running, the processor executes the computer execution instruction stored in the memory, so that the computer executes the following method:
- receiving a data configuration operation request, wherein the data configuration operation request comprises data to be operated;
- allocating an operation serial number to the data configuration operation request; and
- recording the allocated operation serial number in a mapping relationship according to the data configuration operation request, wherein the mapping relationship comprises the data to be operated, a creation operation serial number, and a deletion operation serial number, such that a direct rollback operation to anyone of previous data is implemented when a rollback operation serial number is requested, wherein the rollback operation serial number is anyone of the recorded operation serial numbers in the mapping relationship;

wherein:
- when the data configuration operation request is a data insert request, and the data to be operated is inserted data, the recording the allocated operation serial number in a mapping relationship comprises: recording the creation operation serial number corresponding to the inserted data in the mapping relationship by using the allocated operation serial number, and keeping a deletion operation serial number corresponding to the inserted data empty;
- when the data configuration operation request is a data delete request, the data to be operated is deleted data, the recording the allocated operation serial number in a mapping relationship comprises: recording a deletion operation serial number corresponding to the deleted data in the mapping relationship by using the allocated operation serial number, and remaining a creation operation serial number corresponding to the deleted data unchanged;
- when the data configuration operation request is a data update request, the data to be operated comprises updated data and original data, the recording the allocated operation serial number in a mapping relationship comprises: recording a creation operation serial number corresponding to the updated data in the mapping relationship by using the allocated operation serial number, keeping a deletion operation serial number corresponding to the updated data empty, updating a deletion operation serial number corresponding to the original data in a mapping relationship by using the allocated operation serial number, and remaining a creation operation serial number corresponding to the original data unchanged.

9. The computer according to claim 8, the computer executes the following further method:
- displaying the data to be operated, wherein a creation operation serial number corresponding to the displayed data to be operated is smaller than or equal to a preset operation serial number, and a deletion operation serial number corresponding to the data displayed data to be operated is null or greater than the preset operation serial number;
- wherein the preset operation serial number comprises: the operation serial number allocated to a current data configuration operation request or a preset active operation serial number.

10. The computer according to claim 8, the computer executes the following further method:
- displaying the data to be operated, wherein a creation operation serial number corresponding to the displayed data is greater than or equal to a preset operation serial number, and a deletion operation serial number corresponding to the displayed data to be operated is null or smaller than the preset operation serial number;

wherein the preset operation serial number comprises: the operation serial number allocated to a current data configuration operation request or a preset active operation serial number.

11. The computer according to any one of claim 8, the computer executes the following further method:
deleting the data to be operated, wherein the deletion operation serial number corresponding to the deleted data to be operated is smaller than or equal to an active operation serial number, wherein the active operation serial number is the operation serial number allocated to a current data configuration operation request.

12. The computer according to any one of claim 8, the computer executes the following further method:
obtaining the rollback operation serial number; and
obtaining rollback data, wherein the creation operation serial number corresponding to the rollback data is smaller than or equal to the rollback operation serial number and a deletion operation serial number corresponding to the rollback data is null or greater than the rollback operation serial number.

13. The computer according to any one of claim 8, the computer executes the following further method:
obtaining the rollback operation serial number; and
obtaining rollback data, wherein the creation operation serial number corresponding to the rollback data is greater than or equal to the rollback operation serial number and a deletion operation serial number corresponding to the rollback data is null or smaller than the rollback operation serial number.

14. A non-transitory computer readable medium, comprising a computer execution instruction, wherein, when a processor of a computer executes the computer execution instruction, the computer executes the following method:
receiving a data configuration operation request, wherein the data configuration operation request comprises data to be operated;
allocating an operation serial number to the data configuration operation request; and
recording the allocated operation serial number in a mapping relationship according to the data configuration operation request, wherein the mapping relationship comprises the data to be operated, a creation operation serial number, and a deletion operation serial number, such that a direct rollback operation to anyone of previous data configuration is implemented when a rollback operation serial number is requested, wherein the rollback operation serial number is anyone of the recorded operation serial numbers in the mapping relationship;
wherein:
when the data configuration operation request is a data insert request, and the data to be operated is inserted data, the recording the allocated operation serial number in a mapping relationship comprises: recording the creation operation serial number corresponding to the inserted data in the mapping relationship by using the allocated operation serial number, and keeping a deletion operation serial number corresponding to the inserted data empty;
when the data configuration operation request is a data delete request, the data to be operated is deleted data, the recording the allocated operation serial number in a mapping relationship comprises: recording a deletion operation serial number corresponding to the deleted data in the mapping relationship by using the allocated operation serial number, and remaining a creation operation serial number corresponding to the deleted data unchanged;
when the data configuration operation request is a data update request, the data to be operated comprises updated data and original data, the recording the allocated operation serial number in a mapping relationship comprises: recording a creation operation serial number corresponding to the updated data in the mapping relationship by using the allocated operation serial number, keeping a deletion operation serial number corresponding to the updated data empty, updating a deletion operation serial number corresponding to the original data in a mapping relationship by using the allocated operation serial number, and remaining a creation operation serial number corresponding to the original data unchanged.

* * * * *